(12) United States Patent
Ferreira Moreno et al.

(10) Patent No.: US 11,562,592 B2
(45) Date of Patent: Jan. 24, 2023

(54) DOCUMENT RETRIEVAL THROUGH ASSERTION ANALYSIS ON ENTITIES AND DOCUMENT FRAGMENTS

(71) Applicant: International Business Machines Corporation, Armonk, NY (US)

(72) Inventors: Marcio Ferreira Moreno, Copacabana (BR); Daniel Salles Civitarese, Rio de Janeiro (BR); Rafael Rossi de Mello Brandao, Botafogo (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/258,765

(22) Filed: Jan. 28, 2019

(65) Prior Publication Data
US 2020/0242349 A1  Jul. 30, 2020

(51) Int. Cl.
| | | |
|---|---|---|
| *G06V 30/416* | (2022.01) | |
| *G06N 5/02* | (2006.01) | |
| *G06F 16/901* | (2019.01) | |
| *G06F 16/33* | (2019.01) | |
| *G06F 16/36* | (2019.01) | |
| *G06F 40/30* | (2020.01) | |
| *G06F 40/295* | (2020.01) | |

(52) U.S. Cl.
CPC ............ *G06V 30/416* (2022.01); *G06F 16/33* (2019.01); *G06F 16/367* (2019.01); *G06F 16/9024* (2019.01); *G06F 40/295* (2020.01); *G06F 40/30* (2020.01); *G06N 5/02* (2013.01)

(58) Field of Classification Search
CPC ........ G06F 40/14; G06F 16/36; G06F 40/289; G06F 16/367; G06F 16/9024; G06F 40/30; G06F 40/205; G06F 16/3344; G06N 5/02; G06N 5/022
See application file for complete search history.

(56) References Cited

U.S. PATENT DOCUMENTS

| | | | |
|---|---|---|---|
| 6,233,575 | B1 | 5/2001 | Agrawal et al. |
| 9,436,674 | B2 | 9/2016 | O'Neil |
| 9,734,192 | B2 | 8/2017 | Czarlinska et al. |
| 2006/0155751 | A1 | 7/2006 | Geshwind et al. |
| 2009/0300043 | A1 | 12/2009 | MacLennan |
| 2011/0246179 | A1 | 10/2011 | Neil |
| 2013/0124193 | A1 | 5/2013 | Holmberg |

(Continued)

FOREIGN PATENT DOCUMENTS

| | | |
|---|---|---|
| CN | 104484815 B | 11/2017 |
| CN | 107609132 A | 1/2018 |

*Primary Examiner* — Matthew H Baker
(74) *Attorney, Agent, or Firm* — Scully, Scott, Murphy & Presser, P.C.; Joseph Petrokaitis

(57) ABSTRACT

Document retrieval through assertion analysis on entities and document fragments is disclosed. A document is received. Logical structures and entities are extracted from the document by parsing the document. For an entity in the extracted entities, an object representing the entity is created, an assertion made in the document associated with the entity is determined, and the assertion is linked to the object representing the entity. A logical structure from the extracted logical structures and content of the logical structure containing the assertion are identified and linked to the object representing the entity.

18 Claims, 11 Drawing Sheets

(56) References Cited

U.S. PATENT DOCUMENTS

| | | |
|---|---|---|
| 2013/0305149 A1 | 11/2013 | Dimitrov et al. |
| 2013/0311485 A1 | 11/2013 | Khan |
| 2014/0337306 A1* | 11/2014 | Gramatica .......... G06F 16/2471 707/706 |
| 2015/0169746 A1* | 6/2015 | Hatami-Hanza ...... G06F 16/367 706/18 |
| 2015/0286710 A1 | 10/2015 | Chang et al. |
| 2016/0179945 A1* | 6/2016 | Lastra Diaz ........ G06F 16/3334 707/739 |
| 2017/0060831 A1* | 3/2017 | Smythe .................. G06N 5/048 |
| 2018/0173699 A1 | 6/2018 | Tacchi et al. |
| 2019/0026437 A1* | 1/2019 | Syeda-Mahmood ........................ G06F 40/205 |
| 2020/0242349 A1* | 7/2020 | Ferreira Moreno ... G06N 5/022 |

* cited by examiner

DOCUMENT RETRIEVAL THROUGH ASSERTION ANALYSIS ON ENTITIES AND DOCUMENT FRAGMENTS

BACKGROUND

The present application relates generally to computers and computer applications, and more particularly to search engines and document discovery.

Creating technical and scientific documents include finding related work which support the topics and reasoning presented in the documents being created. While computerized tools such as search engines can perform keyword searches in finding such related work, those keyword searches alone may not be able to find related work that reflect or support the reasoning or assertion advanced by an author in a document.

BRIEF SUMMARY

A method and system may be provided, which may perform document retrieval through assertion analysis on entities and document fragments. A method, in one aspect, may include receiving a document. The method may also include extracting logical structures and entities from the document by parsing the document. The method may also include for an entity in the extracted entities, creating an object representing the entity. Creating of the object may include allocating a memory to store the object representing the entity. The method may also include determining an assertion made in the document associated with the entity. The method may also include linking the assertion to the object representing the entity. The method may also include identifying a logical structure from the extracted logical structures and a content of the logical structure containing the assertion. The method may also include linking the logical structure and the content of the logical structure to the object representing the entity.

A system, in one aspect, may include a hardware processor coupled with a memory device. The hardware processor may be configured to receive a document. The hardware processor may be also configured to extract logical structures and entities from the document by parsing the document. For an entity in the extracted entities, the hardware processor may be configured to create an object representing the entity, determine an assertion made in the document associated with the entity, link the assertion to the object representing the entity, identify a logical structure from the extracted logical structures and a content of the logical structure containing the assertion, and link the logical structure and the content of the logical structure to the object representing the entity.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method, system and techniques are disclosed, which can perform an assertion (e.g., a point of view) analysis on entities, e.g., concepts and terms, present in a document. In one aspect, an analysis may be performed according to a given terminology (e.g., ontology, vocabulary, bag of words). An assertion or a perspective associated with each concept and the terminology can be structured in a knowledge graph. A document can be also structured in a knowledge graph considering the document's organization. An organization structure of a document may include sections, paragraphs, tables, header, footer, or another part or fragment of the document. These structural components or fragments may be also mapped in the knowledge graph as nodes that are connected to the other fragments. The knowledge graph may be used to support queries and document recommendation to a system's end-user. In some aspects, a document can include multimedia content, for example, video, images, web pages, and/or others).

Figure 1:
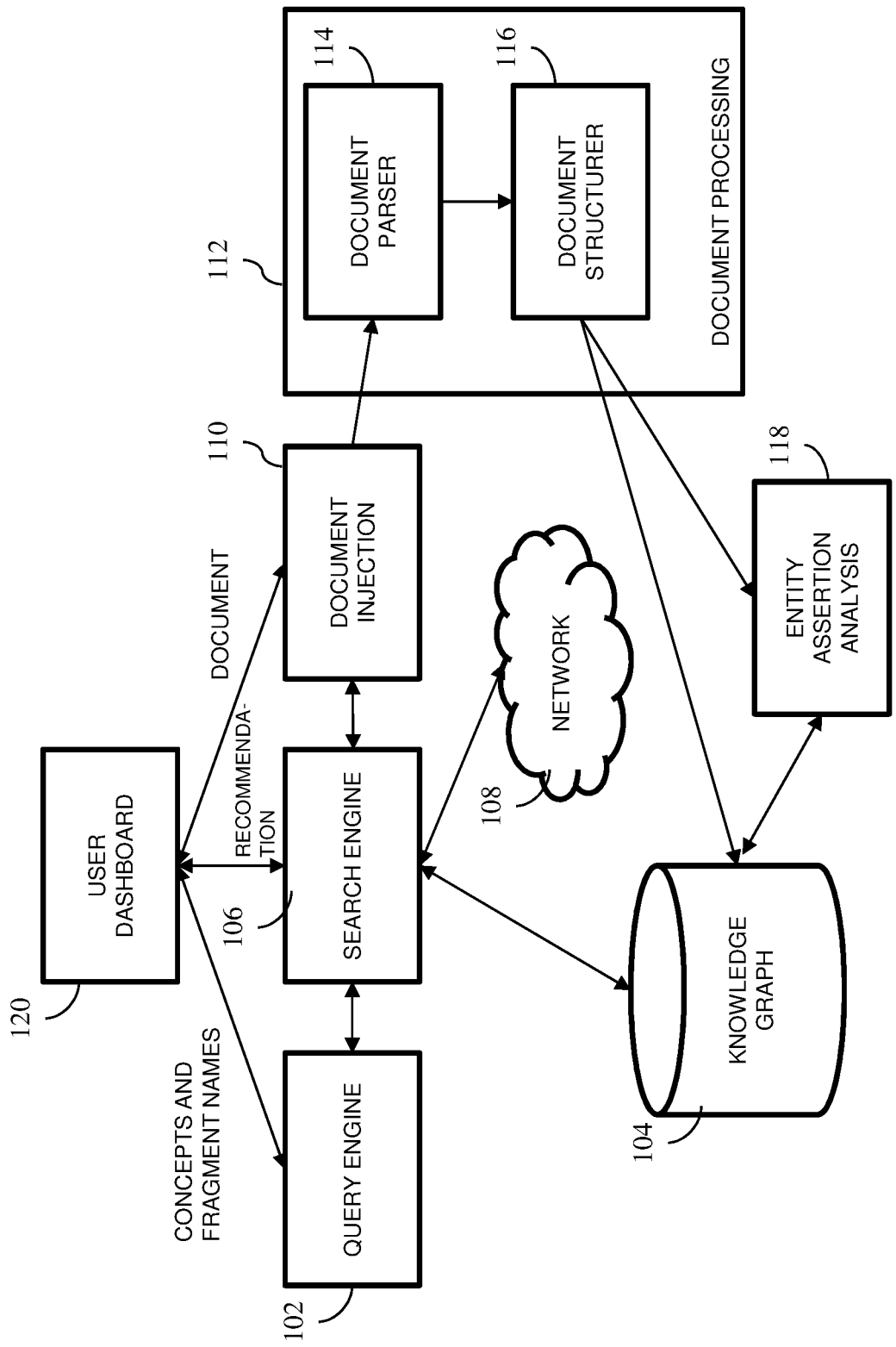
FIG. 1 is a diagram illustrating system architecture in one embodiment.

FIG. 1 is a diagram illustrating system architecture in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

Referring to FIG. 1, a query engine 102 may process user queries, which may include specific terms, concepts and assertions to be retrieved appearing in document fragments. In one aspect, a query in the query engine 102 may be in a structured query language. In another aspect, the query engine 102 may be configured to receive and parse a query which may be in a natural language form. A query, for example, includes a concept or term, and a desired assertion about the concept or term and one or more names or labels of document fragments in which the desired assertion should be found. Based on the concepts and names of fragments, query engine 102 traverses a knowledge graph 104, which may be stored on, and retrieved from, a storage device, for example, a database. The knowledge graph 104 may include nodes and edges connecting the nodes based on relationships between the nodes.

A search engine 106 may fetch one or more documents associated with (e.g., linked with, specified by) nodes of the knowledge graph 104 being traversed, from repositories which may be connected through a communication network 108. One or more fetched documents may be provided, for instance, via a user dashboard 120. In some embodiments, fetched documents that are not structured in the knowledge graph are processed, for instance, to create entity nodes, logical structure nodes, one or more assertion nodes, which are connected based on their relationships, and added to the knowledge graph.

Figure 5:
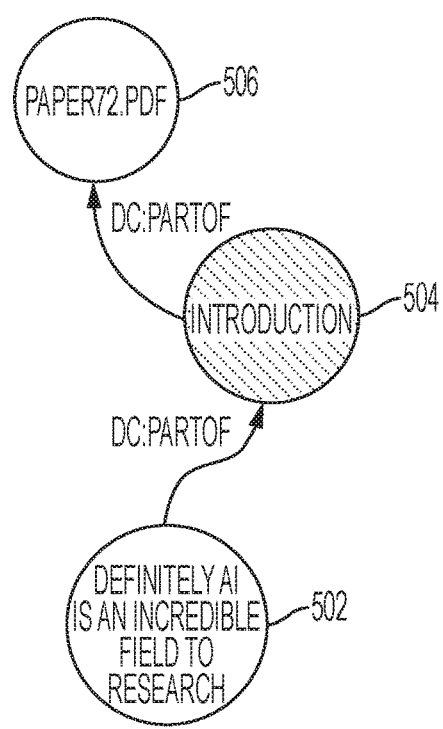
FIG. 5 shows an example of a structured document in one embodiment.

One or more documents may be processed to create a knowledge graph 104. For instance, via a dashboard 120, a user may enter one or more documents to be processed. In another aspect, documents to process may be received automatically, for example, from a search engine, as a result of a search. In one aspect, document processing 112 is triggered by a document injection component 110. The document injection component 110, for instance, triggers building of a knowledge graph of terms and concepts, in which one or more terms and concepts are augmented or linked with assertions and documents fragments containing those assertions. A document, for instance, may be an unstructured document, which a document parser 114 parses, for example, based on syntactic and semantic analysis of the document. In one aspect, a document parser 114 is capable of extracting a logical structure of a given document. For instance, the parser 114 may retrieve annotations and metadata associated with a given document to determine sections, paragraphs, headers, footers, and other parts in the document. The parser 114 may also extract entities (terms or concepts) in the document, based on a predefined ontology associated with a topic or domain. The topic or domain, for example, may be determined based on the content of the document. In another aspect, the topic or domain can be obtained from a user (e.g., use inputs the information via a user dashboard 120 or another interface). A document structurer 116 structures (creates or identifies nodes and links the nodes) the components of the documents in the knowledge graph 104. FIG. 5 shows an example of structured components of a document in one embodiment. In some embodiments, a knowledge graph 102 is a hybrid database capable of storing both facts (e.g., as subject-predicate-object (SPO) triples) and binary data (e.g., documents). A knowledge graph or representation 104 may be capable of storing a structure, e.g., including semantics and terms to signify portions of documents. In one aspect, a knowledge graph 104 represents an extracted assertion of the concept aligned with a structured document fragment. A query engine 102 may be capable of traversing this representation. Structured information can be used by an assertion analysis component 118 which processes extracted concepts and document fragments to determine the type of assertion present in the data.

In one aspect, the processing described above may be performed responsive to a user opening a document or creating a document via a user dashboard 120 or another user interface. Components may be coupled with a word processing or another word editing tool or software, and may be triggered based on an action performed on a document. In one aspect, a user dashboard may open a document (e.g., responsive to a user command), and the action of opening may automatically trigger searching for related artifacts or documents that support the concept found in the opened document. Methodologies of the present disclosure may also be triggered via other mechanisms, for example, inline calls, selecting a menu option, and/or others.

A document analysis on entities or concepts present in a document may be performed according to a given ontology or terminology (also referred to as ontology-oriented assertion analysis). In another aspect, an analysis may be performed according to document structure or specified fragments (also referred to as document fragment analysis). In another aspect, document retrieval through analysis on entities and document fragments may include receiving an assertion, wherein the assertion is a statement of fact or an opinion that is asserted to be true. Based on the assertion, a database of unstructured documents may be searched and, in response, receive search results including one or more unstructured documents. Portions of the unstructured documents may be identified that are consistent with (agree with) the assertion. Recommendation of related documents may be provided. For instance, a reference to the identified portions and the corresponding unstructured documents may be provided or returned. Concepts and entities may be structured according to document structure or specified fragments, and documents' assertion map may be created of multiple concepts and entities present in a given ontology. Document recommendation may be provided through the assertion map.

In one aspect, a system of the present disclosure in one embodiment (e.g., shown in FIG. 1) may perform assertions analysis on entities distributed in documents according to a given terminology (e.g., ontology, vocabulary of words, bag of words, dictionary of words associated with a domain). An assertion of each concept in a given terminology may be structured in a knowledge graph 104. Document structures such as fragments such as section, title, paragraphs, footnotes, and/or others, may be mapped in the knowledge graph 104 as concept nodes. The assertions and the structures may be aligned in the knowledge graph 104, creating document assertions maps that can be used to support queries and document recommendations according to assertions of terms distributed in fragments of the documents.

Figure 2:
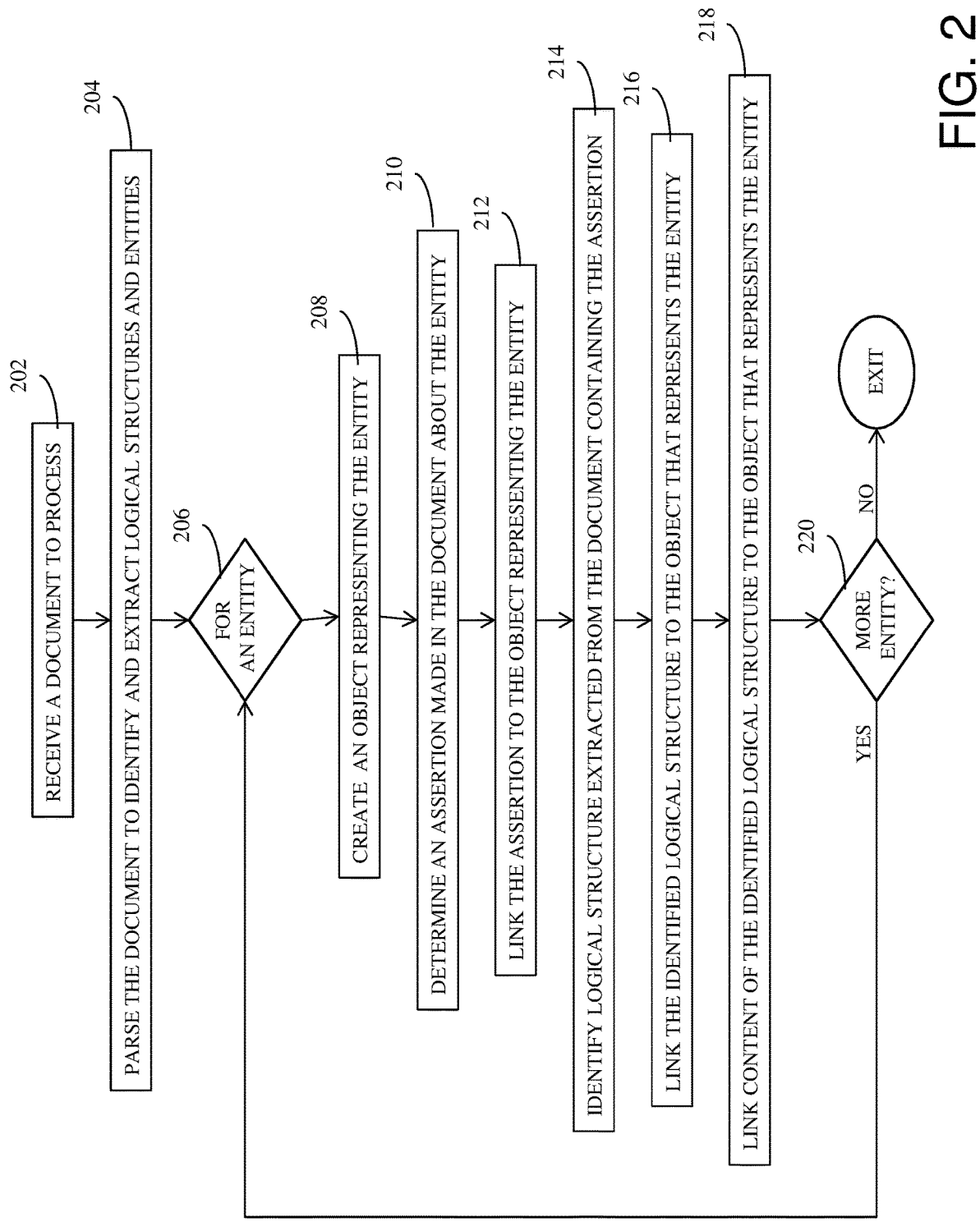
FIG. 2 is a flow diagram illustrating a method of building a knowledge graph in one embodiment.

FIG. 2 is a flow diagram illustrating a method of building a knowledge graph in one embodiment. The method may be performed by one or more hardware processor, for example, coupled with memory. At 202, a document to process is received. For instance, a user may upload one or more documents to be processed into a knowledge graph. In one embodiment, a user interface or dashboard may allow a user to input one or more documents, for instance, by specifying a file name, file path, and/or a link or location where a file is stored. In another aspect, one or more documents may be received automatically, for example, as a result of a automate search engine performing a search on a computer network and returning a result of the search, which may include a list or set of documents.

At 204, the document is parsed to identify and extract logical structures and entities in the document. Logical structures and entities are extracted from the document. Examples of logical structures may include, but not limited to, sections, paragraphs, tables, header, footer, and/or another fragment. Examples of entities may include, but not limited to, terms and concepts. In one aspect, a topic domain associated with the received document may be identified, for example, via automatic document analysis. In another aspect, a topic or domain that is input by a user may be received. Entities associated with the topic may be extracted from the document. For example, entities to extract may be identified based on an existing ontology associated with the topic or domain, which may include terms and/or concepts associated with the topic and relationship associations. For instance, an existing or predefined ontology associated with the topic may be retrieved, for example, from a storage or database of ontologies or like dictionaries. As an example, a graph representation of such an existing ontology may have nodes representing terms or concepts linked by edges that connect the terms or concepts based on relationships between the terms. The terms and concepts in the predefined ontology, for example, represented by the nodes of an ontology graph, may be searched for in the received document and extracted as entities.

In one aspect, for each extracted entity, an assertion analysis may be performed, and the results of the analysis may be structured in a knowledge graph. For example, at 206, for an entity in the extracted entities, an object representing the entity may be created in memory at 208 (also referred to as an in-memory object). For instance, a memory may be allocated to store such an object. At 210, an assertion made in the document about the entity is determined. In one aspect, a semantic analysis may be performed on the document to determine an assertion. For instance, content of the logical structures in which the entity appears in the document may be examined to determine the assertion. Other techniques may be employed to determine an assertion or a point of view asserted about the entity in the document.

At 212, the assertion may be linked to the object representing the entity. For example, in one embodiment, another in-memory object may be created to represent the assertion and linked to the object that represents the entity. At 214, a logical structure or logical structures extracted from the document, which contain or contains the assertion, may be identified. At 216, the identified logical structure or logical structures may be linked to the object that represents the entity. For instance, yet another object may be created to represent the logical structure and linked to the object that represents the entity. Similarly, in one aspect, at 218, content (e.g., text or another content which expresses the assertion) of the logical structure may be linked to the object that represents the entity. For instance, in one embodiment, still another object may be created to represent the content, and may be linked to the object that represents the entity. Linking, for example, may be performed by creating a relationship edge between objects. The structured knowledge graph (e.g., linked objects) may be stored on a storage or memory device, for example, as a database of structure knowledge. In one aspect, the order of the steps need not be followed in the order described. For instance, one or more objects representing logical structures and content of the logical structures may be created and linked to one or more objects representing entities, before or after determining and creating an assertion object to be linked to an entity object.

The processing shown at 208-216 may be repeated for each of the extracted entities or entities determined to have corresponding assertions in the document. For instance, at 220, if there is an entity left to process from the extracted entities, processing continues to 206. The objects representing the entities can be linked, for instance, according to a predefined or existing dictionary of entities, ontology of terms and concepts, or the like. Other formats may be employed to store entities, the relationships between entities, assertions, and fragments of documents containing the assertions. Information such as the document name (or identifier) are also associated with the entities.

Figure 3:
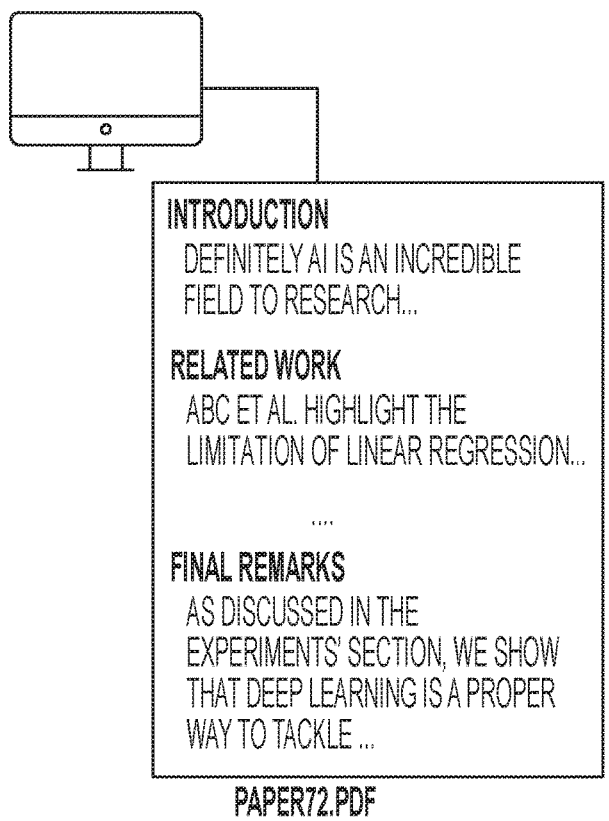
FIG. 3 shows example fragments of an example document in one embodiment.
Figure 4:
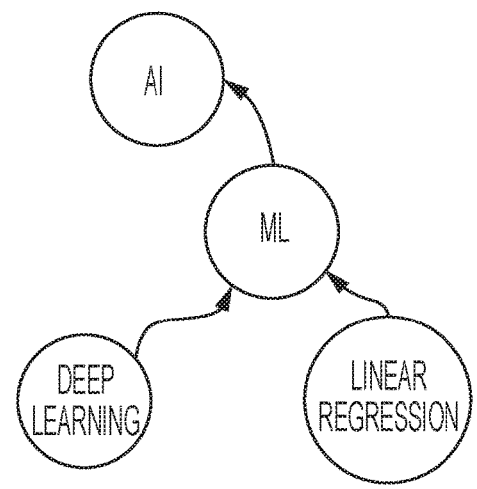
FIG. 4 shows an example of linked entity objects, for example, extracted and linked based on a predefined ontology, in one embodiment.

FIG. 3 shows example fragments of an example document in one embodiment, which may be received by a computer processor. FIG. 4 shows an example of linked entity objects, for example, extracted and linked based on a predefined ontology, in one embodiment. FIG. 5 shows an example of a structured document. Referring to FIG. 3, consider that a topic of the example document is artificial intelligence (AI). An ontology associated with AI topic may be retrieved, which may include nodes and edges, for example, as shown in FIG. 4. Based on such ontology, entities may be extracted from a document, for example, shown in FIG. 3. Examples of entities extracted from the document may include "AI", "ML", "Deep Learning" and "Linear Regression". As shown in FIG. 4, objects may be created corresponding to the entities and the objects linked based on a predefined ontology or another such dictionary. Referring to FIG. 5, extracted fragments (e.g., logical structure) of the document may be represented as objects and the objects may be linked, for instance, to create a structured form of an unstructured document. The links or associations may be hierarchical, e.g., content 502, a fragment (or section) 504 containing the content, and a document identifier 506 containing the fragment. For instance, "Introduction" object (an object representing a logical structure) may be linked or associated with a document identifier object (e.g., "paper72.pdf") (another logical structure object) with a relationship "part of". An object representing a content of the "Introduction", e.g., "Definitely AI is an incredible field to research", may be created and linked (or associated) with the "Introduction" object (an object representing a logical structure) with a linking relationship ("partOf"), indicating that the content object is part of the "Introduction" object. The links or associations may have directions. For instance, in the example shown in FIG. 4, "Deep Learning" and "Linear Regression" entities point to "ML" entity, and "ML" entity points to "AI" entity. In the example shown in FIG. 5, the content object points to "Introduction" object, "Introduction" object points to "paper72.pdf" object.

Figure 6:
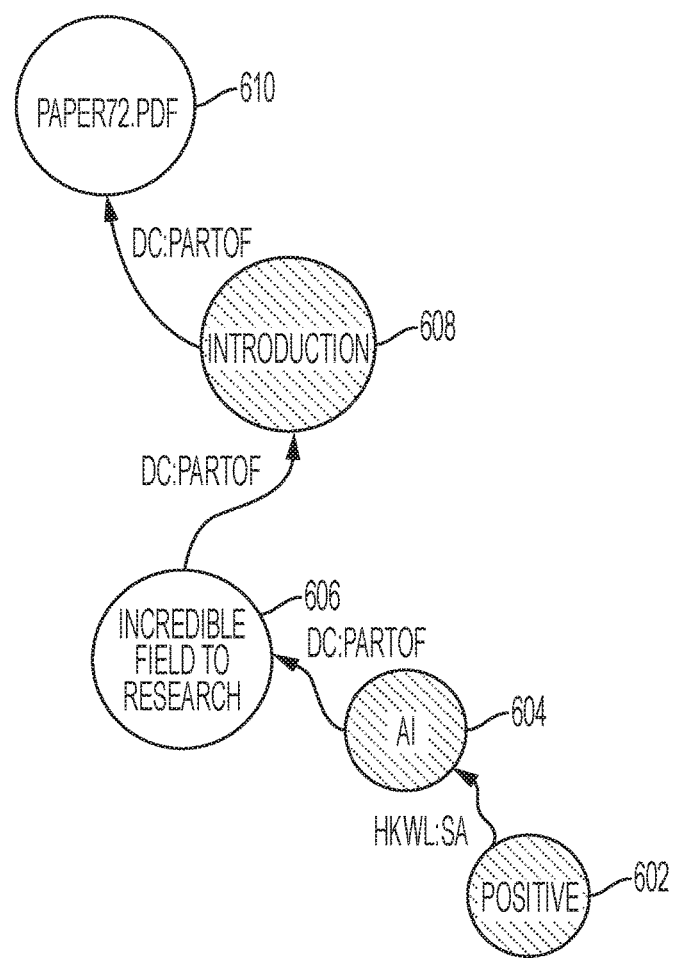
FIG. 6 is an example knowledge graph, which may be constructed, in one embodiment.

FIG. 6 is an example knowledge graph, which may be constructed, in one embodiment. An analysis performed on the example document shows that entity "AI" is treated with favorable view (e.g., assertion=positive), for instance, based on content of the introduction section or logical structure of the document. An object representing an assertion 602 is linked with an object representing an entity 604. This object representing an entity 604 is also linked directly and/or indirectly with one or more objects representing logical structures of the document. For instance, entity 604 is linked with an object representing a content 606 of the document where the entity 604 appears in the document. The object representing a content 606 may be linked with a logical structure object 608 representing a section or paragraph (or another logical structure), in this example, "Introduction" object. That logical structure object 608 is also linked with a document, for example, a document identifier 610. Such structures may be built over many entities over many documents, resulting in a connected knowledge graph comprising entities, associated assertions, and document fragments containing the entities with associated assertions.

Figure 7:
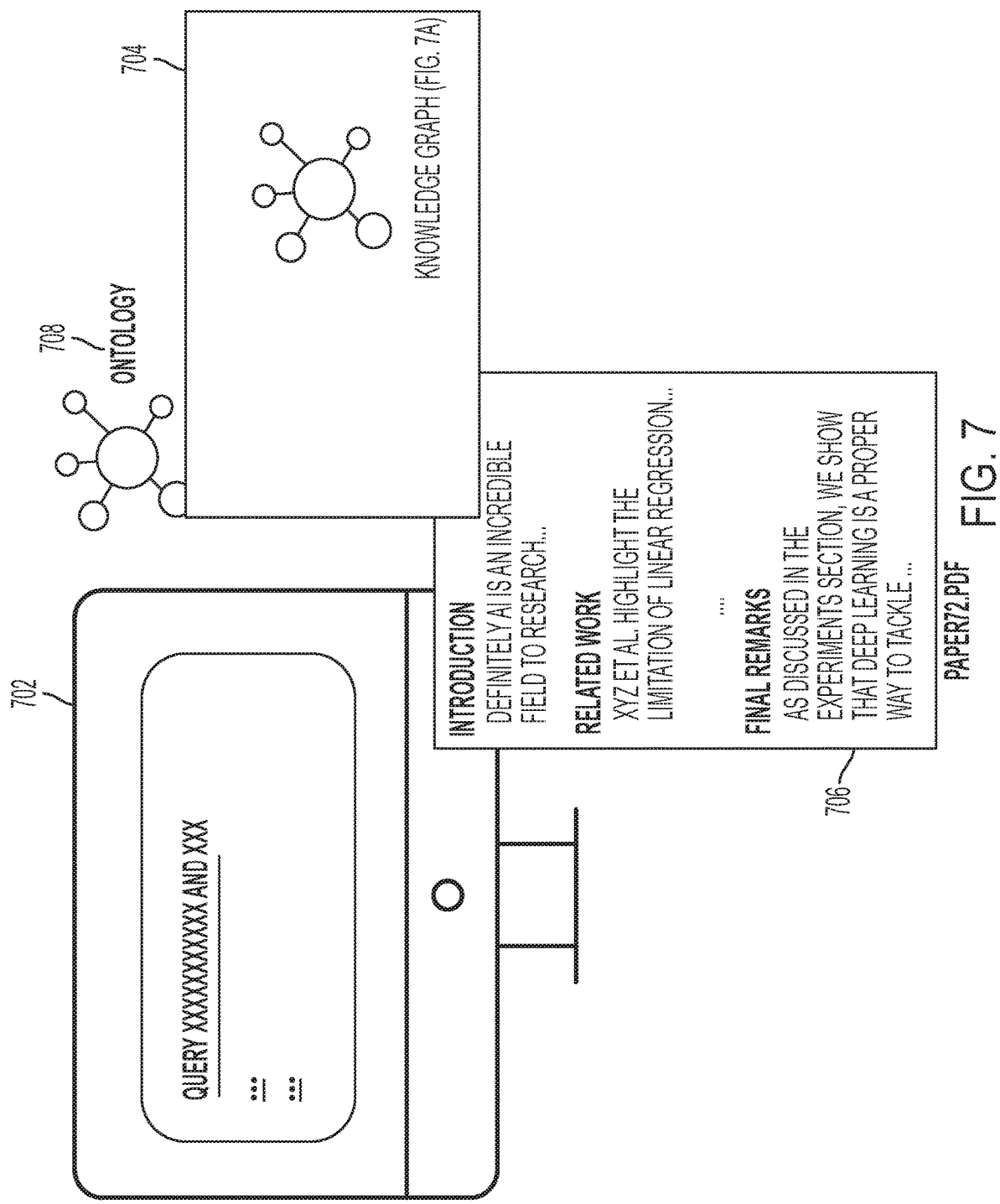
FIG. 7 illustrates a constructed knowledge graph, which can be employed to output results of a query in one embodiment.
Figure 7A:
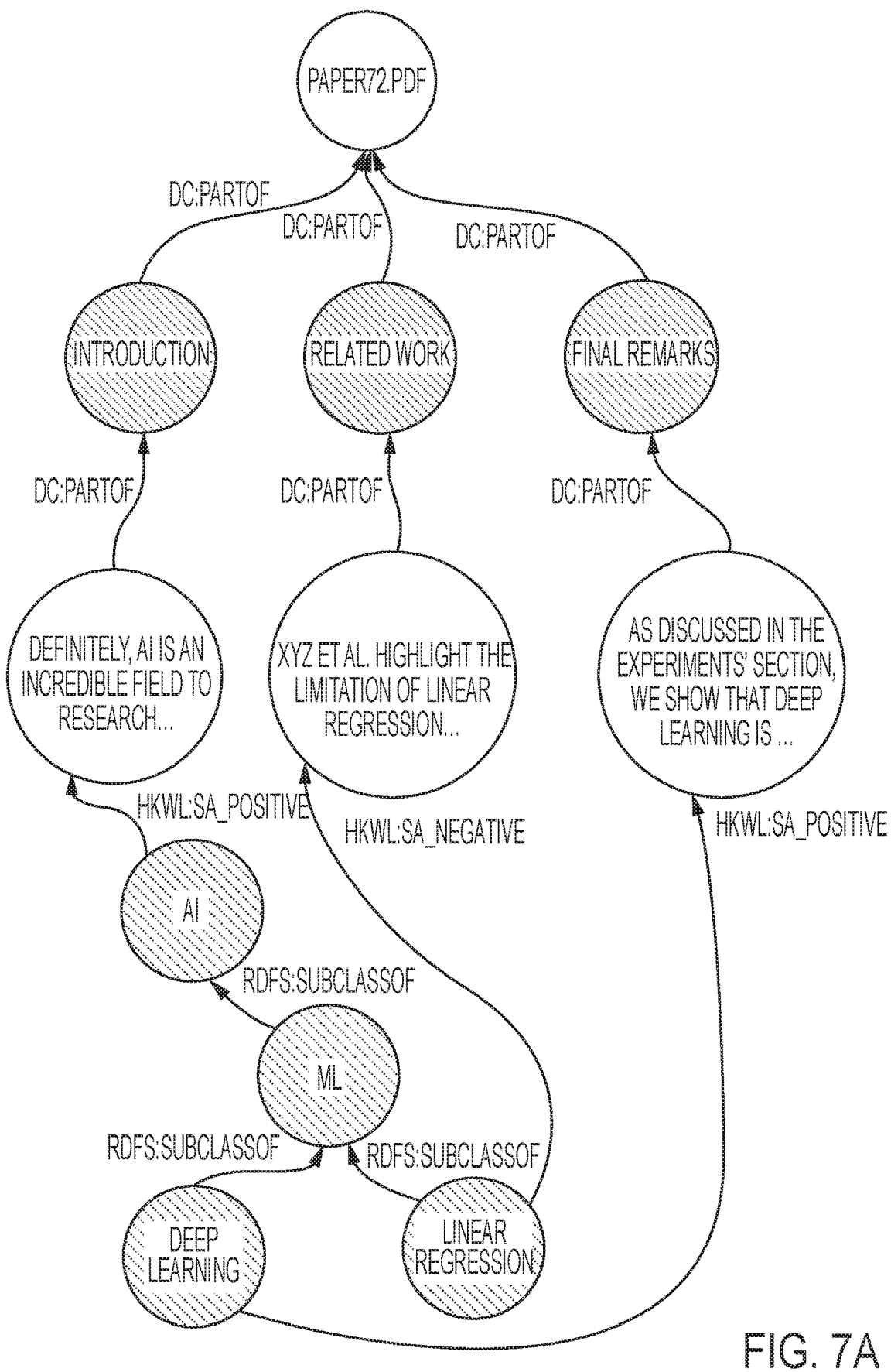
FIG. 7A shows an example knowledge graph in one embodiment.

A query engine in one aspect may employ the knowledge graph in searching for documents with desired assertion. For instance, consider that an author or like user is researching a topic and would like to advance a theory or assertion about the topic. As an example, a user is starting a research on the topic of novel deep learning techniques, however, the user is not aware of any work with similar line arguments or views. The user would like to narrow the search to works exploring limitations of traditional machine learning (ML), and at the same time, highlighting positive aspects of novel deep learning (DL) techniques. A user may run a query engine with input assertion. A query engine of the present disclosure in one embodiment may receive a query, input by a user, and begin searching for documents with similar views using the knowledge graph. An example of a query a user may input may be: "LIST documents stating positive arguments about AI IN the Introduction Section AND negative arguments about traditional ML techniques IN the Related Work AND positive mentions about Deep Learning IN the Final Remarks". FIG. 7 illustrates a constructed knowledge graph, which can be employed to output results of a query in one embodiment. A query entered via a user interface running on a computer processor 702 may trigger a searching of a knowledge graph 704, which may output a document 706 as a result of a query. Search terms may be further augmented by other terms appearing in an ontology of an associated domain 708. FIG. 7A shows example knowledge graph in one embodiment.

As an example, structured representation can be represented based on Resource Description Framework Schema (RDFS) constructs. Other schema may be used. Graph elements or components may be connected or linked by relationships specified in a schema. FIGS. 5, 6 and 7A show structured components represented using Dublin Core ("DC") Schema. Briefly, Dublin Core Schema allows for content description, e.g., digital content description, for instance, in ontology. Hyperknowledge (hkwl), which allow specification of relationships between concept descriptions and content (e.g., multimedia content), can be another example technique used to represent structured components. Other schemas or specifications may be used.

In some embodiments, a system and method may perform assertion analysis on terms defined in a given ontology. In some embodiments, terms found in an ontology and assertions about the terms are represented in a knowledge graph. In some embodiments, document organization is aligned with assertions and represented in the knowledge graph. In some embodiments, document retrieval may be performed through assertions according to document structures and documents may be recommended using the knowledge graph that maps assertions to documents and fragments of documents. Support document retrieval through assertion analysis on entities and document fragments may include performing assertion analysis according to document structure and/or specified fragments. Assertion analysis on concepts or entities present in a given ontology or terminology may be performed. Concepts or entities can be structured according to document structure and/or specified fragments. A method and system may provide for automatic creation of documents' assertion map of multiple concepts and entities present in a given ontology.

Figure 8:
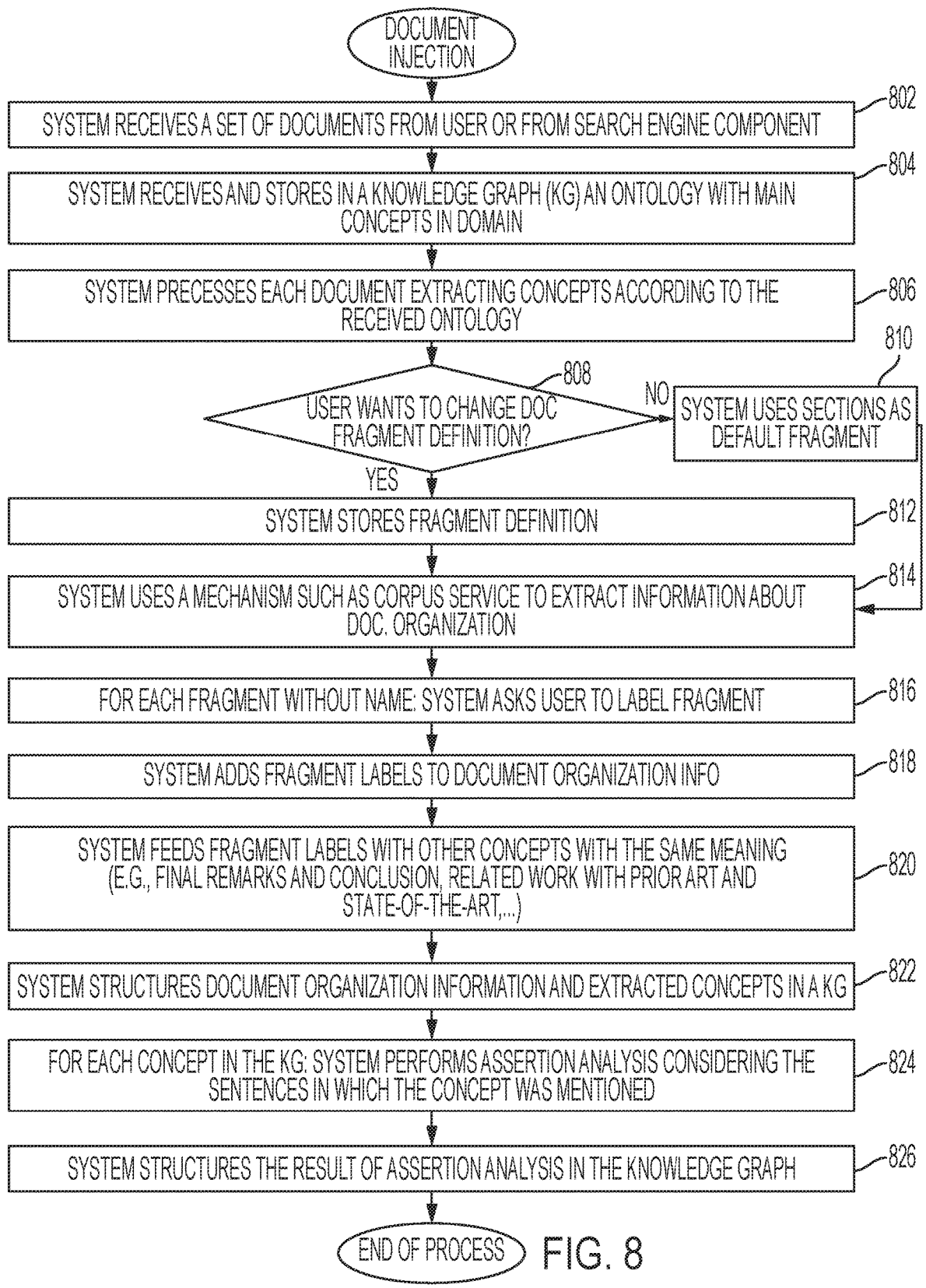
FIG. 8 is a flow diagram illustrating a method of injecting a document in a knowledge graph in one embodiment.

FIG. 8 is a flow diagram illustrating a method of injecting a document in a knowledge graph in one embodiment. For instance, a knowledge graph may be created or updated according to a method shown in FIG. 8. The method may be performed automatically by one or more hardware processors. At 802, one or more documents may be received. In one aspect, a document may be received from a user. For instance, a document may be entered by a user via a user dashboard, user interface, command line or another interface with a computer or machine. In another aspect, a document may be received from an automated system or component such as a search engine. At 804, an ontology, dictionary or another vocabulary of terms or concepts (also referred to as "entities") associated with a domain (e.g., a topic) associated with (e.g., described in) a received document is received and stored in a knowledge graph. "Terms", "concepts" and "entities" are used interchangeably. Such ontology includes terms or concepts which are linked to represent relationships between the linked terms. The terms and their links are stored as part of a knowledge graph.

At 806, the document is processed to extract terms or concepts according to, or specified, in the received ontology. For instance, terms appearing in the ontology are extracted from the received document. At 808, an option may be presented to a user to change document organization, for example, logical structures for structuring into the knowledge graph. At 810, if a document organization is not to be changed, default organization is used and the logic of the method proceeds to 814. For instance, different sections of a document are structured as different fragments. At 812, if a document organization is to be changed, an updated definition is received, for example, from a user, and stored. For instance, a new fragment definition is stored. Examples of new or changed definitions may include, but not limited to, page numbers, paragraph numbers, or another. The logic of the method proceeds to 814.

At 814, information about a document's organization is retrieved. For instance, tools such as corpus conversion service may be employed to extract a document's organization information. At 816, for each fragment without a name, a prompt is sent to a user to enter a name. At 818, fragment labels are added to a document's organization information. At 820, fragment labels are added to concepts with the same meaning (e.g., "conclusion" with "final remarks", "related work" with "prior work". etc.). At 822, document organization information is structured with extracted terms or concepts (entities) in a knowledge graph. At 824, for each of the extracted terms or concepts (entities), assertion analysis is performed to determine assertion made about a term in the document, considering a sentence or description around the term appearing in the document. At 826, a result of the assertion analysis, e.g., determined assertion, is structured with the term in the knowledge graph. The above document processing may be performed for all of the received documents, constructing a knowledge graph comprising terms structured with logical structures of documents and associated assertions.

Figure 9:
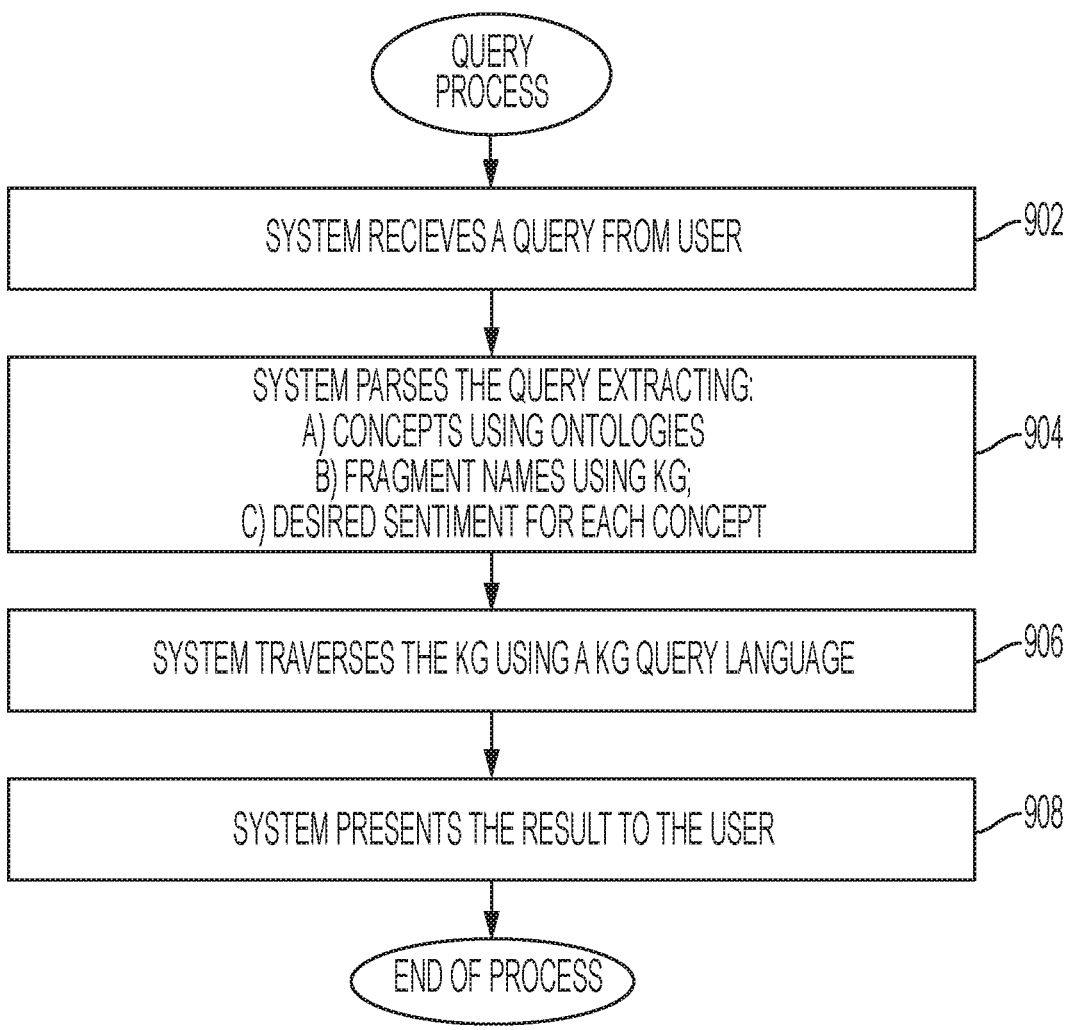
FIG. 9 is a flow diagram illustrating a method of query processing in one embodiment.

FIG. 9 is a flow diagram illustrating a method of query processing in one embodiment. At 902, a query from a user may be received. At 904, the query is parsed. Parsing extracts concepts using one or more ontologies (e.g., ontologies stored in a knowledge base in which a document is injected), fragment names using a knowledge graph (e.g., "introduction", "related work"), and desired assertion associated with each extracted concept. At 906, the knowledge graph is traversed, for example, using a graph traversal language. At 908, a result of the traversal is presented, for example, to a user, via a user interface or dashboard. For instance, a document node and related one or more fragments associated with the desired assertion about the concept in the query (matching the query) may be presented.

Figure 10:
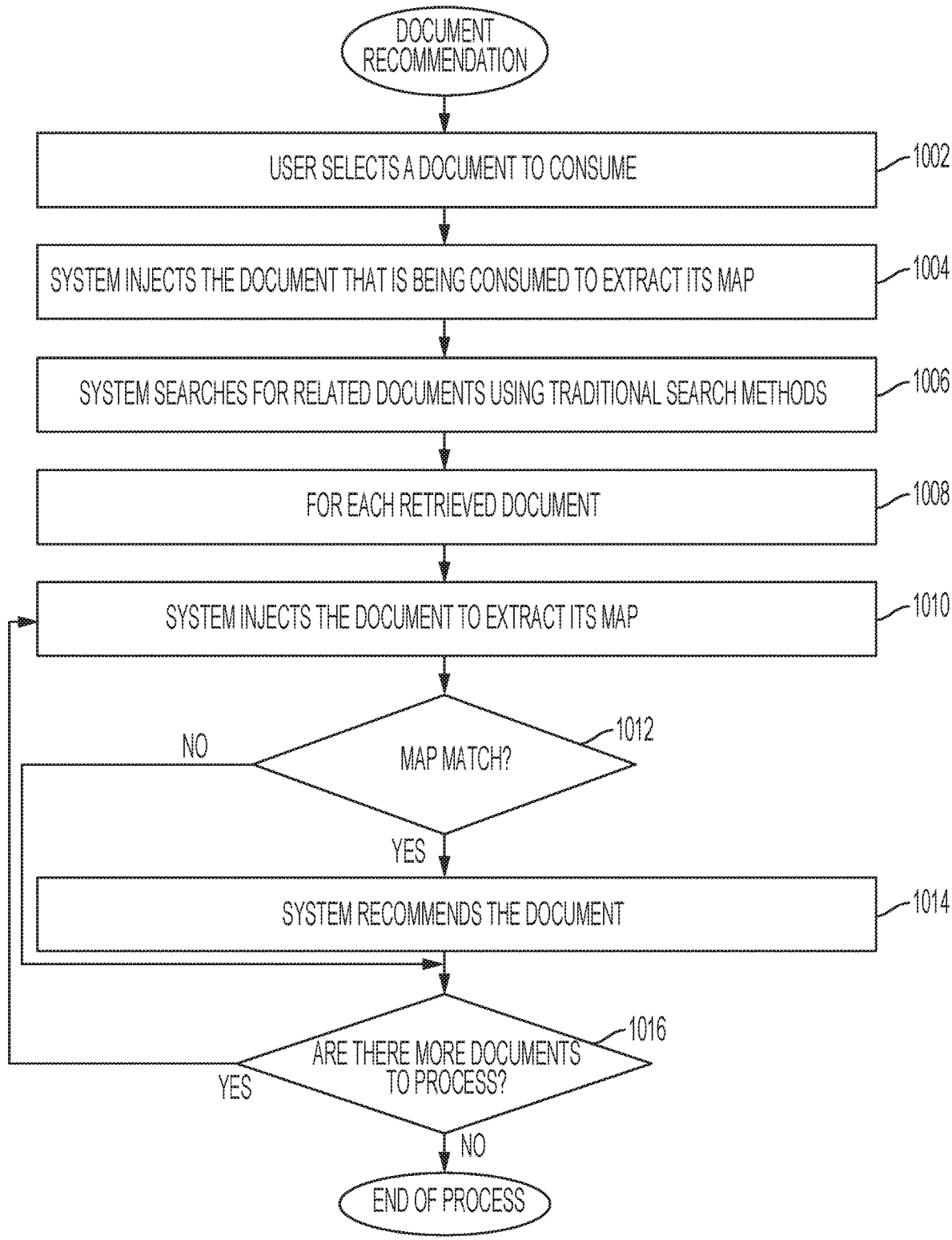
FIG. 10 is a flow diagram illustrating a method of searching for and recommending a document in one embodiment.

FIG. 10 is a flow diagram illustrating a method of searching for and recommending a document in one embodiment. The method, for instance, may be performed by a search engine in one embodiment. At 1002, a document which a user selected to consume is received. For instance, a user via a user dashboard or interface may select a document to read or view. At 1004, the document is processed, to create an assertion map associated with the document. An assertion map, for example, refers to a portion of a knowledge graph, which includes nodes and links associated with entities, assertions, and document fragments, for instance, created according to a method described above, for instance, with references to FIG. 2 and FIG. 8. At 1006, a search engine is triggered to search for related documents, for instance, over a network of computers such as the Internet. For instance, N most frequent concepts or words found in the current document can be used as search terms. These concepts may be used as keywords in traditional search engines. N is a configurable integer.

At 1008, for each retrieved document, processing at 1010, 1012, 1014 and 1016 may be performed, for example, as follows. At 1010, a document is processed to inject the document in the knowledge graph, for instance, according to a method described above, for instance, with reference to FIG. 2 and FIG. 8. At 1012, whether an assertion identified by an assertion map associated with the retrieved document matches an assertion identified by an assertion map associated with a user selected document at 1002. If a match is identified, the retrieved document is recommended at 1014. Otherwise, at 1016, if there are more retrieved documents to process, the logic of the method may proceed back to 1010. If, at 1016, no other retrieved documents need to be processed, the processing to recommend a document may end.

Figure 11:
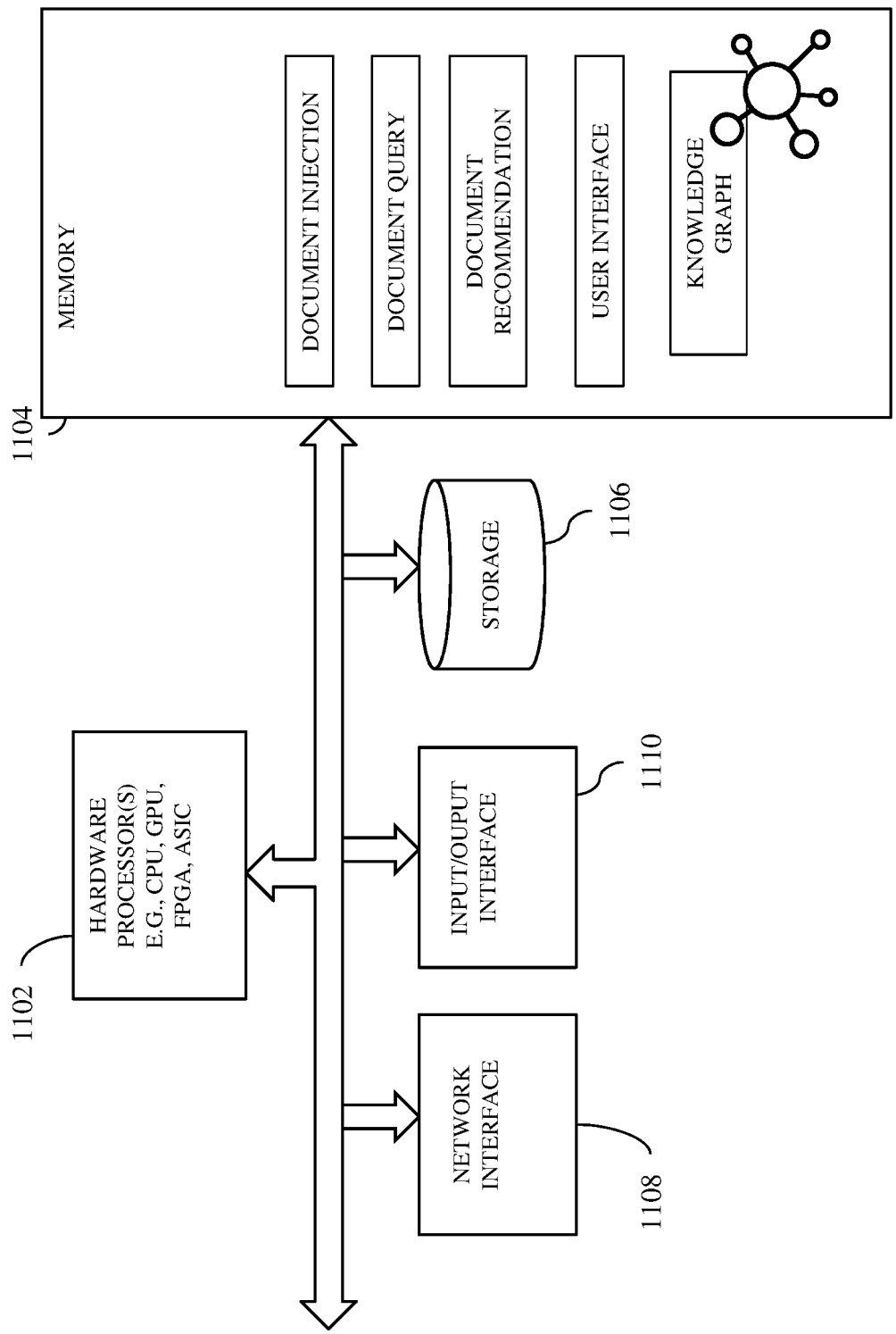
FIG. 11 is a diagram showing components of a system in one embodiment that creates knowledge graphs and assertion maps, and provides document recommendations.

FIG. 11 is a diagram showing components of a system in one embodiment that creates knowledge graphs and assertion maps, and provides document recommendations, for instance, described above. One or more hardware processors 1102 such as a central processing unit (CPU), a graphic process unit (GPU), and/or a Field Programmable Gate Array (FPGA), an application specific integrated circuit (ASIC), and/or another processor, may be coupled with a memory device 1104, and perform one or more of document injection (e.g., as described with reference FIG. 2 and also described with reference to FIG. 8), document query (e.g., described with reference to FIG. 9) and/or document recommendation (e.g., as described with reference to FIG. 10). The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 1104 may, for example, store instructions and/or data for functioning of the one or more hardware processors 1102, and may include an operating system and other program of instructions and/or data. One or more hardware processors 1102 may receive input comprising document identification, selective parts of knowledge graph, etc. For instance, at least one hardware processor 1102 may generate a knowledge graph based on document processing (e.g., document injection), which may be employed in an assertion query and document recommendation. In one aspect, a knowledge graph or data associated with the knowledge graph may be stored in a storage device 1106 or received via a network interface 1108 from a remote device, and may be temporarily loaded into the memory device 1104 for augmenting, querying and/or recommending. One or more hardware processors 1102 may be coupled with interface devices such as a network interface 1108 for communicating with remote systems, for example, via a network, and an input/output interface 1110 for communicating with input and/or output devices such as a keyboard, mouse, display, and/or others.

Figure 12:
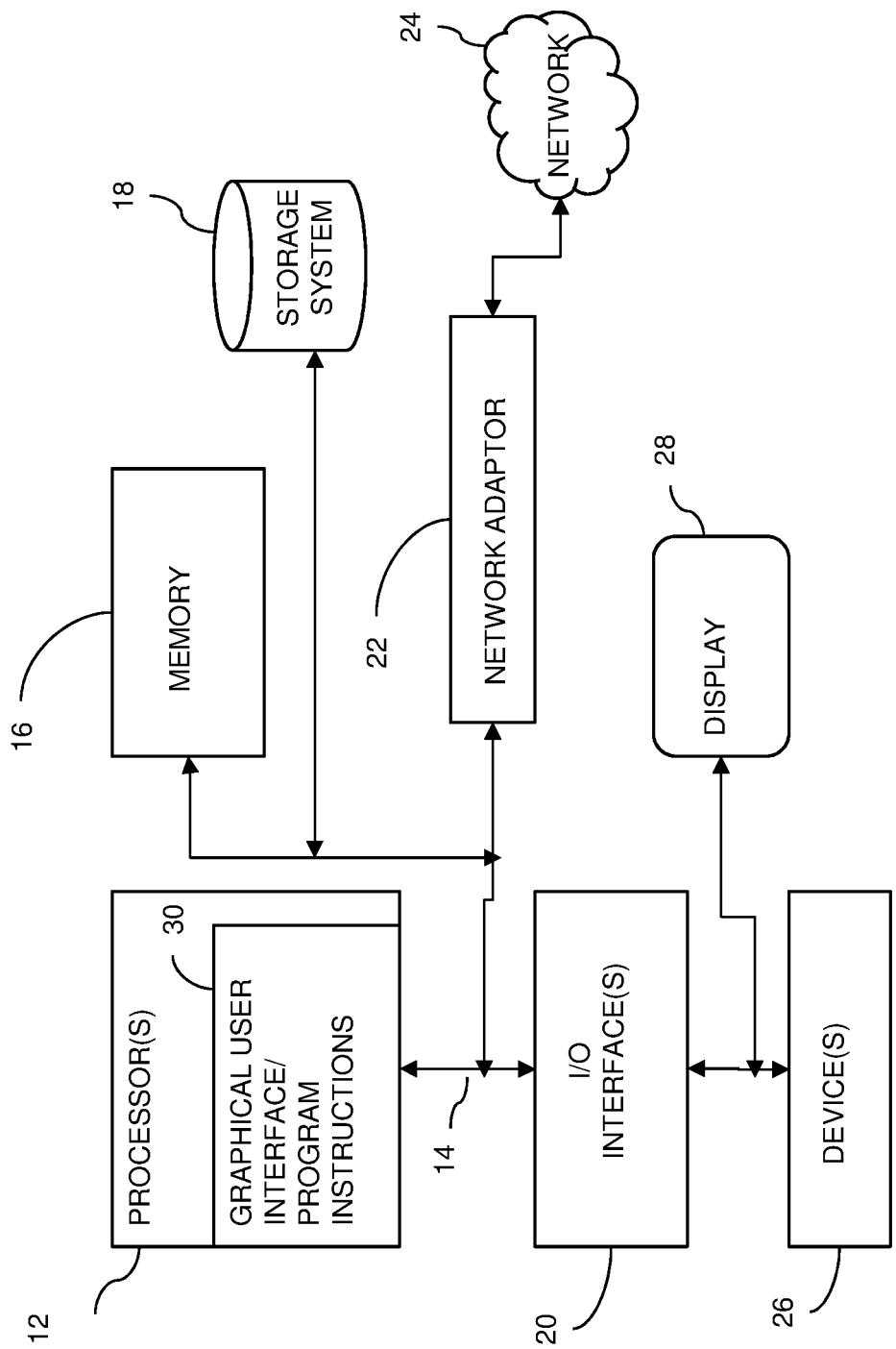
FIG. 12 illustrates a schematic of an example computer or processing system that may implement a document injection and query system in one embodiment.

FIG. 12 illustrates a schematic of an example computer or processing system that may implement a document injection and query system in one embodiment of the present disclosure. The computer system is only one example of a suitable processing system and is not intended to suggest any limitation as to the scope of use or functionality of embodiments of the methodology described herein. The processing system shown may be operational with numerous other general-purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random-access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method performed by at least one hardware processor, comprising:
   receiving a document;
   extracting logical structures and entities from the document by parsing the document, the logical structures including sectional fragments of the document representative of the document's organization;
   for an entity in the extracted entities,
      creating an object representing the entity, the creating the object comprising allocating a memory to store the object representing the entity;
      determining an assertion made in the document associated with the entity;
      linking the assertion to the object representing the entity;
      identifying a logical structure from the extracted logical structures and a content of the logical structure containing the assertion;
      labeling the logical structure with a name that identifies where in the document the assertion appears; and
      linking the logical structure and the content of the logical structure to the object representing the entity,
   wherein a database of structured knowledge is built that links the entities to corresponding assertions and corresponding logical structures in which the entities occur,
   wherein the logical structure is linked to the object representing the document with an attribute representing an organizational relationship of the logical structure to the document, wherein a structured form of the document is created.

2. The method of claim 1, wherein the creating of an object representing the entity, the determining of an assertion made in the document associated with the entity, the linking of the assertion to the object representing the entity, the identifying of a logical structure from the extracted logical structures and a content of the logical structure containing the assertion, and the linking of the logical structure and the content of the logical structure to the object representing the entity, are performed for each of the extracted entities, wherein objects representing the extracted entities are linked based on a predefined dictionary of terms.

3. The method of claim 2, wherein the method is repeated for a plurality of documents received, wherein a plurality of linked objects representing the entities with linked logical structures and associated content are stored on a storage device.

4. The method claim 3, further comprising:
   receiving a query comprising a candidate assertion associated with a candidate topic;
   searching by traversing the plurality of linked objects for the candidate assertion; and
   returning one or more documents resulting from the searching.

5. The method of claim 1, wherein the entities are extracted based on a predefined dictionary of terms associated with a domain of the received document.

6. The method of claim 1, wherein the linking the assertion to the object representing the entity comprises creating an in-memory object representing the assertion and linking the in-memory object representing the assertion to the object representing the entity.

7. The method claim 1, wherein the linking the logical structure and the content of the logical structure to the object representing the entity comprises creating an in-memory object representing the logical structure and an in-memory object representing the content of the logical structure, and linking the in-memory object representing the logical structure and the in-memory object representing the content of the logical structure with the object representing the entity.

8. The computer program product of claim 1, wherein the entities are extracted based on a predefined dictionary of terms associated with a domain of the received document.

9. The computer program product of claim 8, wherein the device is caused to link the assertion to the object representing the entity by creating an in-memory object representing the assertion and linking the in-memory object representing the assertion to the object representing the entity.

10. The computer program product of claim 9, wherein the device is caused to build the database of structured knowledge over multiple documents.

11. The computer program product of claim 10, wherein the device is further caused to:
   receive a query comprising a candidate assertion associated with a candidate topic;

search by traversing the plurality of linked objects for the candidate assertion; and return one or more documents resulting from the searching.

12. The computer program product of claim 8, wherein the device is caused to link the logical structure and the content of the logical structure to the object representing the entity by creating an in-memory object representing the logical structure and an in-memory object representing the content of the logical structure, and linking the in-memory object representing the logical structure and the in-memory object representing the content of the logical structure with the object representing the entity.

13. A computer program product comprising a computer readable storage medium having program instructions embodied therewith, the program instructions readable by a device to cause the device to:

receive a document;

extract logical structures and entities from the document by parsing the document, the logical structures including sectional fragments of the document representative of the document's organization;

for an entity in the extracted entities, create an object representing the entity, the creating the object comprising allocating a memory to store the object representing the entity;

determine an assertion made in the document associated with the entity;

link the assertion to the object representing the entity;

identify a logical structure from the extracted logical structures and a content of the logical structure containing the assertion;

label the logical structure with a name that identifies where in the document the assertion appears; and link the logical structure and the content of the logical structure to the object representing the entity, wherein a database of structured knowledge is built that links the entities to corresponding assertions and corresponding logical structures in which the entities occur, wherein the logical structure is linked to the object representing the document with an attribute representing an organizational relationship of the logical structure to the document, wherein a structured form of the document is created.

14. The computer program product of claim 13, wherein the device is caused to repeat creating of an object representing the entity, determining of an assertion made in the document associated with the entity, linking of the assertion to the object representing the entity, identifying of a logical structure from the extracted logical structures and a content of the logical structure containing the assertion, and linking of the logical structure and the content of the logical structure to the object representing the entity, for each of the extracted entities, wherein objects representing the extracted entities are linked based on a predefined dictionary of terms.

15. A system comprising:

a hardware processor coupled with a memory device, the hardware processor configured to:

receive a document;

extract logical structures and entities from the document by parsing the document, the logical structures including sectional fragments of the document representative of the document's organization;

for an entity in the extracted entities, create an object representing the entity, the creating the object comprising allocating a memory to store the object representing the entity;

determine an assertion made in the document associated with the entity;

link the assertion to the object representing the entity;

identify a logical structure from the extracted logical structures and a content of the logical structure containing the assertion;

label the logical structure with a name that identifies where in the document the assertion appears; and link the logical structure and the content of the logical structure to the object representing the entity, wherein a database of structured knowledge is built that links the entities to corresponding assertions and corresponding logical structures in which the entities occur, wherein the logical structure is linked to the object representing the document with an attribute representing an organizational relationship of the logical structure to the document, wherein a structured form of the document is created.

16. The system of claim 15, wherein the hardware is configured to repeat creating of an object representing the entity, determining of an assertion made in the document associated with the entity, the linking of the assertion to the object representing the entity, identifying of a logical structure from the extracted logical structures and a content of the logical structure containing the assertion, and linking of the logical structure and the content of the logical structure to the object representing the entity, for each of the extracted entities, wherein objects representing the extracted entities are linked based on a predefined dictionary of terms.

17. The system of claim 15, wherein the entities are extracted based on a predefined dictionary of terms associated with a domain of the received document.

18. The system of claim 17, wherein the hardware processor links the assertion to the object representing the entity by creating an in-memory object representing the assertion and linking the in-memory object representing the assertion to the object representing the entity.

* * * * *